United States Patent [19]

Mayeaux et al.

[11] Patent Number: 5,601,713

[45] Date of Patent: Feb. 11, 1997

[54] FILTER SYSTEMS AND APPARATUS

[75] Inventors: Donald P. Mayeaux, Prairieville, La.; James E. Gotch, Willoughby; Christopher J. Kmetko, Solon, both of Ohio

[73] Assignee: Nupro Company, Willoughby, Ohio

[21] Appl. No.: 349,919

[22] Filed: Dec. 6, 1994

[51] Int. Cl.⁶ ............................................. B01D 35/157
[52] U.S. Cl. .................. 210/426; 210/432; 210/433.1; 210/443; 210/450; 210/451; 210/453
[58] Field of Search ........................... 210/232, 422–426, 210/428, 433.1, 440, 443, 450, 452, 453, 432; 55/270, 312, 417–419

[56] References Cited

U.S. PATENT DOCUMENTS

| | | | |
|---|---|---|---|
| 3,237,770 | 3/1966 | Humbert | 210/232 |
| 3,455,459 | 7/1969 | Troy | 210/315 |
| 3,501,005 | 3/1970 | Russo et al. | 210/90 |
| 3,521,673 | 7/1970 | Gruner et al. | 137/625.29 |
| 3,698,562 | 10/1972 | Farrow et al. | 210/488 |
| 3,767,054 | 10/1973 | Farrow et al. | 210/232 |
| 4,032,107 | 6/1977 | Kelchner | 251/296 |
| 4,529,514 | 7/1985 | Gruett | 210/234 |
| 4,717,474 | 1/1988 | Sims | 210/180 |
| 4,728,421 | 3/1988 | Moddemeyer | 210/232 |
| 4,827,979 | 5/1989 | Boddy | 137/625.29 |
| 4,836,923 | 6/1989 | Popoff et al. | 210/232 |
| 4,880,536 | 11/1989 | Haraveth et al. | 210/232 |
| 5,092,993 | 3/1992 | Goodwin | 210/202 |
| 5,215,658 | 6/1993 | Luby | 210/232 |
| 5,234,592 | 8/1993 | Schneider | 210/440 |
| 5,389,260 | 2/1995 | Hemp et al. | 210/450 |

Primary Examiner—Matthew O. Savage
Attorney, Agent, or Firm—Fay, Sharpe, Beall, Fagan, Minnich & McKee

[57] ABSTRACT

A filter and a filter and valve assembly primarily intended for use in fluid analyzer systems for particulate or coalescing filtration of fluids includes a filter assembly having a base element with all port openings in the base and with the port openings arranged so that the assembly can be mounted in a variety of selected positions. An integrally valved filter assembly is also disclosed and is provided with a rotary valve that can control flow between a filter chamber and multiple supply and/or discharge ports.

10 Claims, 5 Drawing Sheets

FILTER SYSTEMS AND APPARATUS

BACKGROUND OF INVENTION

The subject invention is directed toward the art of fluid filters and, more particularly to filter devices and systems especially suited for use in conjunction with fluid analyzers.

Typically, sample fluids require particulate filtration or coalescing of small liquid droplets prior to analysis by on-line analyzers. The reason for this requirement is that if particulates are not adequately filtered from sample fluids, damage to the analyzers and/or associated system components can result. Similarly, small liquid droplets, suspended in gas or a second immiscible liquid, can interfere with the accuracy of the analysis and, in some circumstances, cause damage to sensitive analyzers.

The particulate and coalescing filters used to meet the above requirements are found in sample conditioning systems for both on-line process analyzers and environmental analyzers. The need for such filters is rapidly increasing because of increased governmental regulation (EPA and OSHA) pertaining to monitoring and record keeping of environmental releases and employee exposure to process fluids. Also, the need is accelerated because of a trend of increasing use of on-line analysis in lieu of "grab sample" analysis. This results from increasing labor costs and a need for more rapid analysis demanded by current process control strategies.

A variety of filters are currently available for particulate and coalescing filtration of sample fluids. Many of them, however, are less than satisfactory for one or more of a variety of reasons. For example, almost all commercially available units require comparatively extensive associated piping and valving to provide the controls necessary for allowing selective use, bypassing, and filter changing. This associated structure tends to take up a significant amount of space on control panels and the like. Moreover, with many prior art units slight changes in filter types or styles necessitate complete housing changes. Additionally with many of the units it is necessary to disconnect associated piping to effect filter changing.

SUMMARY OF INVENTION

The subject invention provides filter designs that overcome the above and other problems encountered with prior filter units.

In accordance with one aspect of the invention, there is provided a filter assembly which is particularly suited for fluid analyzer systems for particulate or coalescing filtration of fluids. The filter assembly generally comprises a rigid body having spaced upper and lower faces joined by exterior side walls. A circular filter receiving bore extends into the body from the upper face and terminates in a lower wall with a reduced diameter counterbore extending inwardly from the lower wall. Positioned within the filter receiving bore is a tubular filter element having a lower end resting on the lower wall in surrounding relationship to the counterbore. The filter element extends outwardly from the filter receiving bore and terminates in an upper end. A housing having a lower end is joined to the body about the filter receiving bore with an opening extending from the housing lower end and forming a continuation of the filter receiving bore to define an enclosed filter chamber about the filter element. A groove is formed in the lower end of the housing in encircling relationship to the opening that extends from the housing lower end. The groove has a radial outer wall and a seal ring is positioned in the groove to seal between the housing lower end and the body. A first pair of radially spaced fluid passages extend through the body from the exterior side walls and open to the filter receiving bore at locations radially outward of the filter. Additionally, there is at least one additional fluid passage spaced from the first pair of fluid passages to extend through the body from the exterior side walls and open to the counterbore.

In one preferred form, the filter assembly has a female nut member which joins the housing to the body. The female nut means allows clamping of the filter to the body be effected without rotation of the housing relative to the body or the filter. This allows for better sealing between the housing and the body and allows improved seal materials to be used. Additionally, the non-rotational clamping of the filter element is preferred since there is a less likelihood of damage to the filter element itself.

Preferably, it is possible to include a second additional fluid passage extending from the exterior side walls to open to the counterbore. As will subsequently be explained, the provision of plural passageways to both sides of the filter allows mounting in a variety of configurations either left hand or right hand while maintaining a gravity drain. This facilitates the use of the filter on control panels and the like.

In accordance with a further aspect of the invention, there is provided a filter having a filter chamber with a filter that divides the filter chamber into first and second portions and wherein the body includes a valve chamber formed at a location subjacent the filter chamber. At least five fluid flow passages connect from the exterior of the body to the valve chamber. Positioned in the valve chamber is a valve means selectively movable between first and second positions. The valve means is operable in the first position to connect a first and a second of the fluid flow passages with the first portion of the filter chamber and simultaneously connect a third flow passage with the second portion of the valve chamber while preventing flow through the fourth and fifth of the flow passages. In the second position the valve means is operable to prevent flow through the first, second and third flow passages while connecting the fourth flow passage to the first portion of the filter chamber and connecting the fifth flow passage with the second portion of the filter chamber.

In its preferred form, the valve means comprises a single cylindrical valve element mounted for rotation in the valve chamber. The valve element is mounted for movement past the at least five flow passages. In this form of the invention, the integrated valving means facilitates the ability to block process fluids and purge the valve chamber with an inert fluid. This significantly reduces the risk of personal exposure to process fluids. Moreover, by integrating the valving into the filter body component, original installation costs are lowered, panel space required is minimized and the possibility of incorrect sequencing of the valving operations is eliminated. Additionally, this particular arrangement further increases the opportunity for automatic actuation for automated and/or remote control operation.

By integrating two of the valve units, it is possible to provide for rapid manual or automatic switching between two separate filters. One filter can be "on-line" while the other is in a "purge" mode. Operation of the two valves can be integrated or the valves can be operated independently. If operated independently as integral valves, then it is also possible to have both filters simultaneously in the same mode to provide flexibility. An example of when this would be required would be when a plant is in a "upset condition" or upon "start-up". Both filters might be required in parallel to provide the required sample fluid flow.

With the first version of the filter which does not include the integral valving, all of the port connections to the fluid passageways may be located in the base or body element. Thus, it is not necessary to disconnect process lines to service the filter element itself. As a consequence, time required for servicing the element is reduced and the risk of personal exposure to process fluids is also reduced. Moreover, the probability of port connection leaks is substantially lowered. The particular base port connection without any port connections being required in the housing allows the entire unit to be mounted with the filter element extending horizontally, thus further reducing panel space requirements.

As can be seen from the foregoing, a primary object of the invention is the provision of filter assemblies which are particularly suited for use for either particulate filtration or coalescing filtration of fluid lines prior to taking samples from the fluid lines directly to analysis by on-line analyzers.

A further object of the invention is the provision of filter systems of the general type described which simplifies installation and provides distinct operating advantages.

A still further object of the invention is the provision of filter apparatus of the type described which provides increased safety for operating personnel and which is extremely simple to use and which reduce the possibility of improper sequencing of the control functions.

Still other objects are to provide filter apparatus which are extremely simple to install and which allow the installers a variety of options to simplify the overall installation and reduce space requirements.

BRIEF DESCRIPTION OF THE DRAWINGS

The above and other objects and advantages will become apparent from the following description which when read in conjunction with the accompanying drawings wherein.

DETAILED DESCRIPTION OF THE PREFERRED EMBODIMENT

Figure 1:
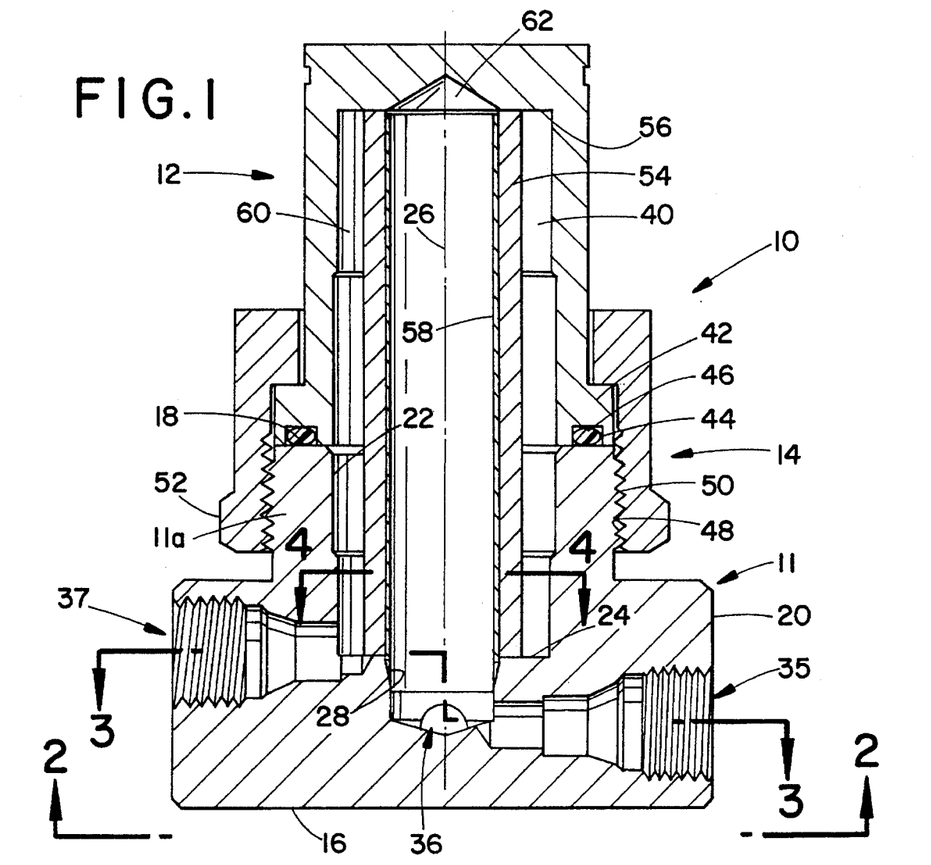
FIG. 1 is a cross-sectional view through a filter assembly formed in accordance with a first aspect of the invention.
Figure 2:
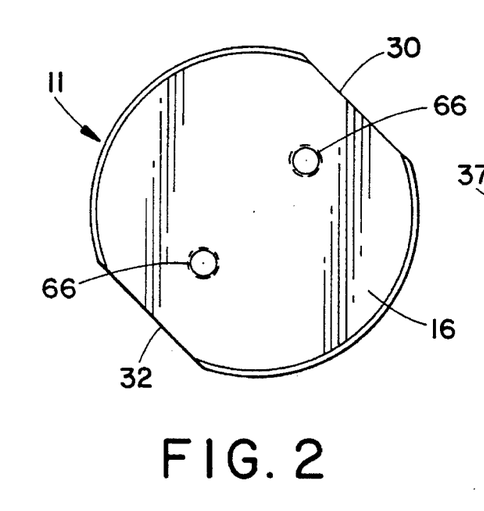
FIG. 2 is a bottom plan view of the filter apparatus shown in FIG. 1 (the view is taken on line 2—2 of FIG. 1)
Figure 3:
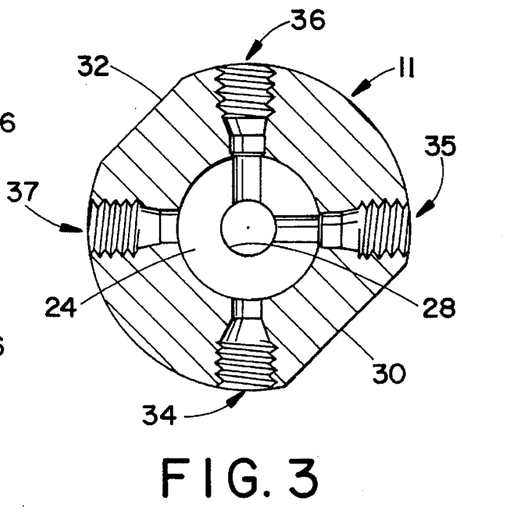
FIG. 3 is a cross-sectional view taken on line 3—3 of FIG. 1.

Referring more particularly to the drawings for the showing of the purposes of illustrating preferred embodiments of the invention only, and not the purpose of limiting the same, FIGS. 1–3 show the first preferred embodiment of the invention. In the subject specification and claims, the terms "upper" and "lower" and other terms regarding spacial orientation have been used to describe features of the devices shown in the drawings. Those of ordinary skill in the art will recognize that the devices shown can often have other orientations and the noted terms should not in and of themselves be considered as limiting the orientation of the devices or the coverage of the claims. As shown in FIGS. 1–3, the filter assembly 10 generally includes a main base or body element 11 associated with a housing or globe portion 12 that is connected releasibly to the base 11 through a nut assembly 14. The base or body 11 is preferably formed from a suitable material such as stainless steel and is shown as a one piece design having a lower face surface 16 and an upper face surface 18 with surrounding side walls 20. Walls 16 and 18 are, in the subject embodiment, parallel.

Extending axially inward from the upper face 18 is a cylindrical bore 22 that terminates in an annular bottom wall 24. Preferably, the bore 22 has its center axis 26 perpendicular to the lower face 16. Extending inwardly from the lower wall 24 of bore 22 is a somewhat smaller diameter counterbore portion 28.

Referring in particular to FIG. 3, it will be noted that the body 11 is provided with opposed flats 30 and 32 which serve as wrench flats for providing ready means for holding the body during filter changing and mounting operations as will subsequently become apparent.

Extending into the body at radially spaced locations about the chamber or bore 22 are four fluid passages 34, 35, 36, and 37. The details and further explanation of the various passages 34 through 37 will subsequently be described. For the present, it is sufficient to note that passages 34 and 37 open to the bore 22 whereas passages 35 and 36 open into the counterbore 28.

As previously mentioned, the housing or globe element 12 joins to the upper surface 18 of the body 11. As particularly illustrated, the housing 12 comprises a generally cylindrical body formed of any suitable metal, or even a glass, plastic, or other non-metal, if desired, and has a central, axially extending bore 40 that is preferably of the same diameter as bore 22 and forms a continuation of the filter receiving chamber defined by bore 22.

About the lower end of the housing 12 there is a radially extending flange 42 provided with an inwardly extending seal receiving groove 44 of rectangular cross section. The groove 44 includes radial inner and outer walls which confine a suitable O-ring seal member 46 for sealing between the housing 12 and body 11. The use of a confined seal ring groove such as groove 44 allows use of a variety of different seals including seals having flow characteristics such as Teflon or the like.

As previously mentioned, the housing 12 is releasibly connected to the body 11 by the female nut member 14 which has internal threads 48 cooperating with external threads 50 formed on the upper cylindrical portion 11A of body 11. The nut member 14 is preferably knurled for manual tightening and is also provided with suitable wrench flats or tool engaging surfaces 52 to allow it to be unthreaded from the body for releasing the housing 12 from the body 11 and providing access to the filter receiving chamber.

Positioned within the filter receiving chamber defined by the aligned bores 22 and 40, is a tubular cylindrical filter member 54 that is clampingly held in position by clamped engagement between the bottom wall 24 and the inner upper end of bore 40 identified with the reference numeral 56. Preferably, a cylindrical support element in the form of a sleeve 58 is carried in the filter chamber with its lower end received in the counterbore 28 and its upper end slightly spaced from end wall 56. The sleeve 58 acts as an alignment device and is preferably a rigid sleeve formed from a suitable mesh or perforated material so that fluid can readily pass through. On the other hand, the filter element 54, in some instances, could be self-supporting and could be any of a variety of well known types of filter materials useful for the purposes intended and the selection of which would depend upon particular type of fluid being encountered and whether the unit is intended for coalescing or particulate filtration. For example, the filter 54 could even be a sintered metal filter if desired. Other suitable filters that could be useful are porous plastics, membrane filters, fiber filters, or any of many conventional types.

As shown, the filter 54 is substantially less in diameter than the diameter of the bores 22, 40. It thus divides the filter receiving chamber into an outer annular open area 60 and a central inner area 62. As noted earlier, the passages 34 and 37 in body 11 communicate with the outer portion of the bore 22 and thus provide direct connection with the filter chamber portion 60. On the other hand, passages 35 and 36 communicate with the counterbore 28 and thus communicate directly with the inner portion 62 of the filter chamber of bores 22 and 60.

Although a variety of connections or fittings could be provided in association with the passageways 34–37 in the subject embodiment they are provided with suitable threaded ports for direct threaded connection with the associated piping.

Although, as can be readily understood, the major functions of the subject filter assembly, i.e. particulate filtration or coalescing filtration, could be performed with only one of the two ports 35 or 36, the subject four port design with the ports generally located as shown best in FIG. 3 is somewhat preferred since it greatly increases the options available in mounting the unit. Additionally, because all porting is in the body 11, no ports or passageways are required through the wall of the housing or globe section 12. Thus, mounting of the unit directly to a control panel is possible with the globe section extending horizontally. For this reason, and as shown in FIG. 2, suitable mounting means such as tapped openings 66 are provided in the bottom of face 16.

Figure 4A:
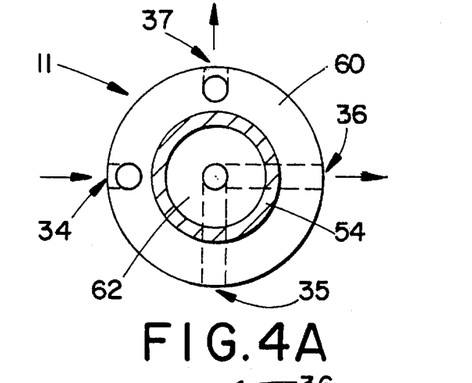
FIGS. 4A–4F are diagrammatic showings illustrating the various ways in which the FIGS. 1–3 embodiment can be installed and used.

FIGS. 4A through 4F are cross-sectional views taken generally on a transverse plane as identified with the numerals 4 in FIG. 1. These views are somewhat diagrammatic and illustrate the various arrangements that the four port embodiment of FIGS. 1 through 3 may be utilized in either a coalescing or filtering mode so that many different inlet, outlet, and bypass arrangements can be achieved to facilitate mounting and to more readily adapt the filter assembly for various types of panel mounting and piping arrangements. FIG. 4A illustrates the unit mounted for use in the particulate filtering mode with the main supply inlet on the left side and an outlet to an analyzer on the right side. Note that the inlet supply port used is port 34 which opens to the filter chamber portion 60 and, in the FIG. 4A showing, the main bypass through the unit is port 37 so that the major portion of flow throughout the unit merely passes through inlet port 34, chamber portion 60, to the port 37 to bypass the filter 54 and pass out of the unit. The port 36 serves as the filtered material discharge port to the analyzer unit. The port 35 in this arrangement can be plugged or can serve as a downstream gauge port.

Figure 4B:
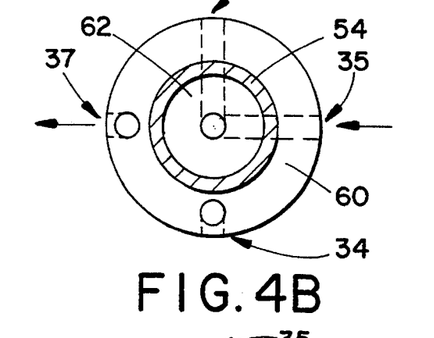
Figure 4C:
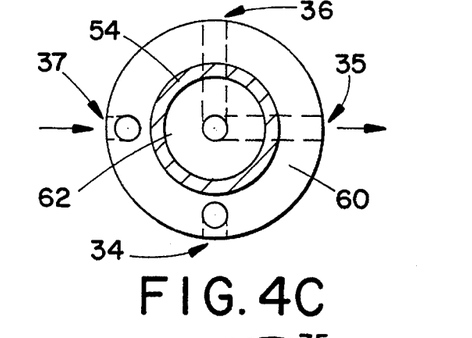

FIG. 4C also shows the unit functioning in a particulate filtering mode but with the unit rotated 90° relative to the FIG. 4A showing. This allows the unit to have the bypass outlet port in the bottom or lower position while the inlet and the outlet to the analyzer remain in the same orientation as was present in the FIG. 4A arrangement.

Figure 4D:
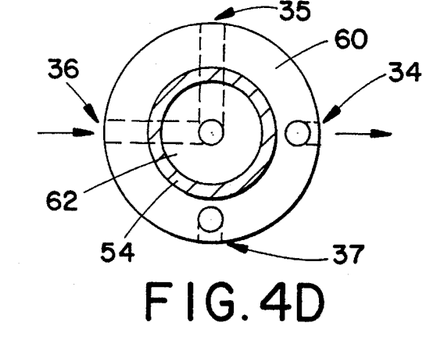
Figure 4E:
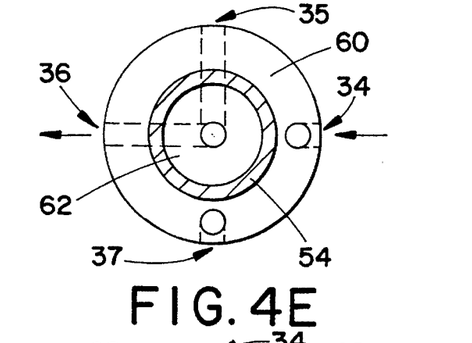
Figure 4F:
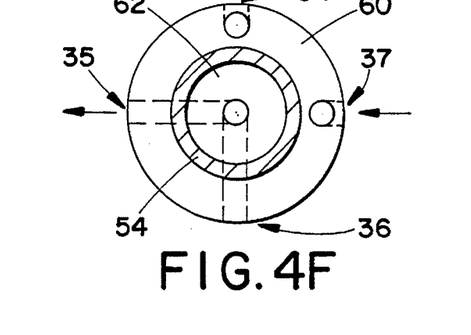

FIG. 4E and 4F are also illustrations of the unit functioning in the particulate filter mode. In these two arrangements which are rotated from the FIGS. 4A and 4C position, the same unit can be mounted so that the main inlet is on the right side and the outlet to the analyzer is on the left side. However, FIG. 4E allows the main bypass to be on the lower side of the drawing whereas FIG. 4F allows it to be on the upper or top side of the drawing.

FIGS. 4B and 4D illustrate the inventive filter assembly of the subject invention in the coalescing mode. In the coalescing mode, the main inlet to the unit is taken to filter chamber portion 62 and a coalescing filter is used so that droplets in the fluid are coalesced and taken to a lower drain and bypass outlet. The arrangement shown in FIG. 4B allows the inlet to be on the right side of the unit and the outlet on the left side, assuming the unit is mounted in the preferred horizontal position. The FIG. 4D showing, which is rotated only 90° from FIG. 4B, allows a left-hand inlet and a right-hand outlet.

As can be seen from the foregoing discussion of FIG. 4A through 4F, the subject four port form of the invention offers a variety of mounting arrangements and allows installers and operators to greatly simplify the piping and general overall arrangement of the control panels.

Figures 5, 6, 7:
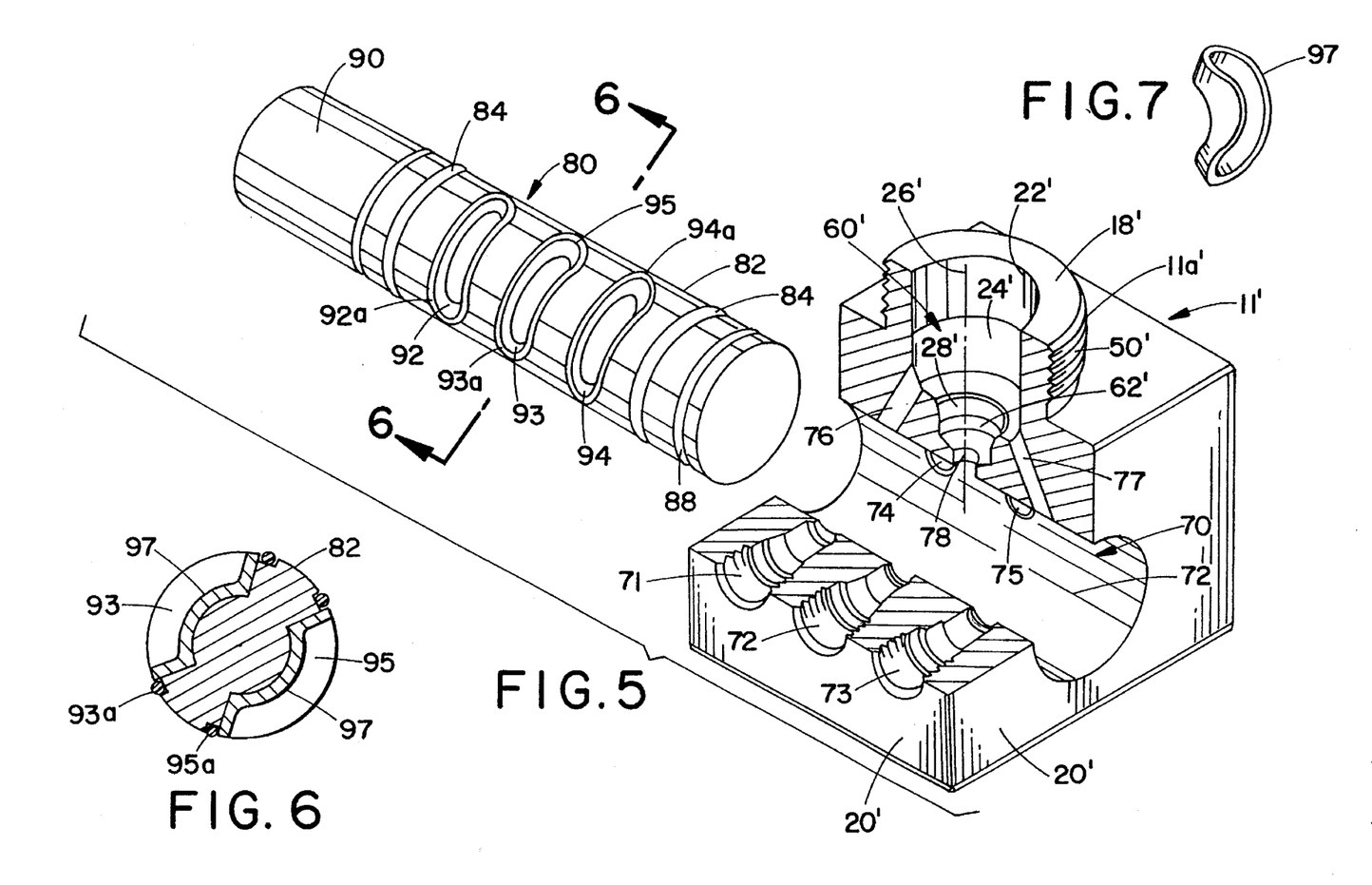
FIGS. 5–7 are pictorial views and illustrate a base or body portion for the filter assembly wherein valving is included to allow rapid changeover of the various functions of the filter assembly; and, FIGS. 8A–8F show the various ways in which the embodiment of FIG. 5 can be used in a process system to obtain samples for supplying to an in-line analyzer unit.

FIGS. 5 through 8 illustrate a modified form of the invention wherein the base or body portion of the assembly is designed with an integral valving assembly that allows rapid changeover between the filtering and purging functions as well as greatly facilitating operation including installation and servicing. In the FIGS. 5 through 8 embodiment, the same reference numerals as those used in the description of the FIGS. 1 through 4 embodiment have been used to identify the same or closely similar components but differentiated therefrom by the addition of a prime suffix. The use of such a prime reference numeral is to be taken as indicative of the same function and operation as described earlier unless otherwise noted. FIG. 5 is an exploded pictorial view partial in cross-section. As illustrated therein, the body 11, is shown but the related housing, filter elements, and the female nut member are not shown, but these are or would preferably be as illustrated in the FIGS. 1 through 3 embodiment. Of particular importance to the FIG. 5 showing is the arrangement of the body 11' wherein there is a horizontally extending cylindrical valve chamber 70 positioned to extend through the center of body 11' generally perpendicular to the axis 26' of bore 22'. As illustrated, the center axis 72 of the cylindrical valve chamber 70 preferably intersects the axis 26' of bore 22'. Also formed to extend from the outer side wall 20' into intersecting relationship with the valve chamber 70 are at least five flow passages identified as 71 through 75. In this embodiment, passages 71 through 75 are arranged so as to enter the valve chamber 70 in aligned intersecting relationship with the center axis 72 as illustrated. It should be noted that passages 71 and 74 are in alignment with one another on opposite sides of valve chamber 70. Similarly, passages 72 and 75 are also diametrically opposed and in alignment on opposite sides of the valve chamber 70.

Connecting from the valve chamber 70 to the filter chamber portion 60' (the areas annularly about the filter) is a pair of passages 76 and 77. It can be seen that passage 76 is arranged so as to enter the valve chamber 70 at a location that is in vertical alignment with the axis 72 in the same plane as passages 71 and 74. The passage 77, however, while it is in alignment vertically with the axis 72, lies in the same plane as passage 73. A single passage 78 is positioned so as to enter the counterbore 28' so as to connect with the filter chamber portion 62'. This passage 78 is in vertical alignment with the axis 72 and in the same plane as passages 72 and 75.

Flow between the various passages 71 through 78 is controlled by a valve means 80 that comprises a cylindrical valve element 82 mounted for rotation within the valve chamber 70. The valve element 82 has a diameter which is only slightly less than the diameter of the valve chamber 70 and is provided with suitable O-rings 84 located adjacent the opposite ends. Suitable snap rings (not shown) are received in grooves 82 and engage associated walls of the body 11' and hold the valve in located position within the valve chamber 70 while permitting free rotation. A suitable end extension 90 on the element 82 provides a manual operating handle for selective rotation of the valve element within the valve chamber 70.

The valve element 82 is provided with surface recesses 92 through 95 that provide flow controlling means. These recesses are machined into the surface of element 82 and are surrounded about their periphery by an O-ring 92a, 93a, 94a, and 95a, respectively as shown. FIG. 6 illustrates the relationship of the recesses relative to the valve element's 82 outer surface. The O-rings are maintained in their located position with an inner retaining wall provided by a suitable insert member 97 (see FIG. 7) which is joined into the center portion of the machined recess and held therein in any suitable manner.

The recess 92 is located at an axial position on the valve element 80 to correspond to the axial location of passages 71, 74, and 76. The circumferential length of the recess 92 is sufficient such that when the valve element 82 is in the first position of rotation illustrated, the passage 92 provides a fluid flow connection between passage 76 71 and passage 76. However, when the valve element is rotated 90° clockwise (as viewed from the right in FIG. 5), passage 71 is in effect disconnected from passage and a new connection made between passage 76 and passage 74. A generally similar arrangement is provided by recesses 93 and 95. Recess 93 is of a size such that when the valve element is in the first position illustrated in FIG. 5, a connection is made between passage 72 and passage 78. The passage 75 is, however, sealed from the valve chamber 70 by the O-ring associated with recess 95 because the O-ring is in surrounding relationship to passage 75. When the valve element 82 is rotated 90° clockwise, however, recess 93 shifts and connects passage 75 with passage 78. The recess 95 moves over and seals off about the passage 72. A similar arrangement is present with recess 94 which, in the position shown, provides a sealed connection between inlet or passage 73 and passage 77. In the second position of 90° rotation clockwise, however, passage 77 is sealed and no connection is made between passage 73 and passage 77.

This relatively simple valve arrangement offers significant operation advantages for the filter assembly whether operated in the particulate filtration mode or the coalescing filtration mode. These advantages and manner of functioning can best be understood by reference to FIGS. 8A through 8F.

Figure 8A:
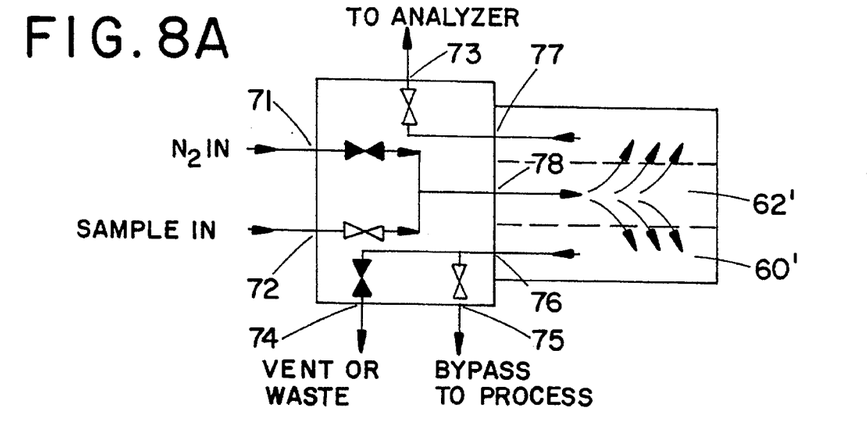

Referring in particular to FIG. 8A, the unit of FIG. 5 is shown diagrammatically connected with the various process lines that would be used in a typical installation. The FIG. 8A is for normal coalescing filtration operation. In this type of operation, a purging fluid such as nitrogen would be connected with port 71. The main filtration supply would be connected to port 72 and port 73 would serve as an outlet port connecting a small portion of the fluids supplied through the filter chamber to an associated analyzer. Port 74 would be connected to vent or waste and port 75 would be connected to supply the main portion of the filtered fluid bypassed about the filter to the process line. Note that in this showing of FIG. 8A, the valve element 82 is in the solid line position shown in FIG. 5. At this time, connections are made between ports 72 and 78 so that the main supply is taken into the filter chamber portion 62' where it passes through the filter into chamber portion 60'. At this time, ports or passages 76 and 77 are connected with passages 75 and 73, respectively.

Figure 8B:
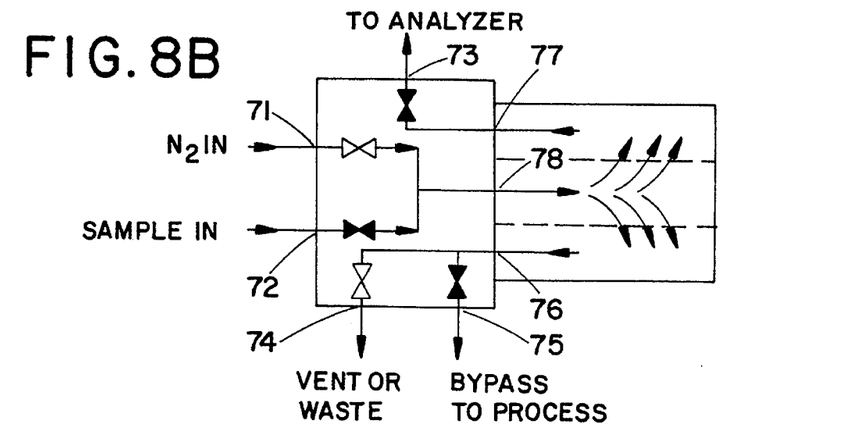

When it is desired to terminate the operation of FIG. 8A and purge the filter, the valve 82 is rotated clockwise 90° from the FIG. 5 showing. As shown in FIG. 8B, this then closes the connection between passage 72 and passage 78 while simultaneously opening the passage 71 and connecting it with passage 78 to thereby permit nitrogen gas to flow into the filter chamber portion 62'. Simultaneously, the connection between passage 75 and 76 is closed and the passage between passage 74 and 76 is opened so that the purging gas is connected to the vent or waste outlet line. It should also be noted that the passage connection between 73 and 77 is simultaneously closed so that none of the purging fluid is passed to the analyzer.

Figure 8C:
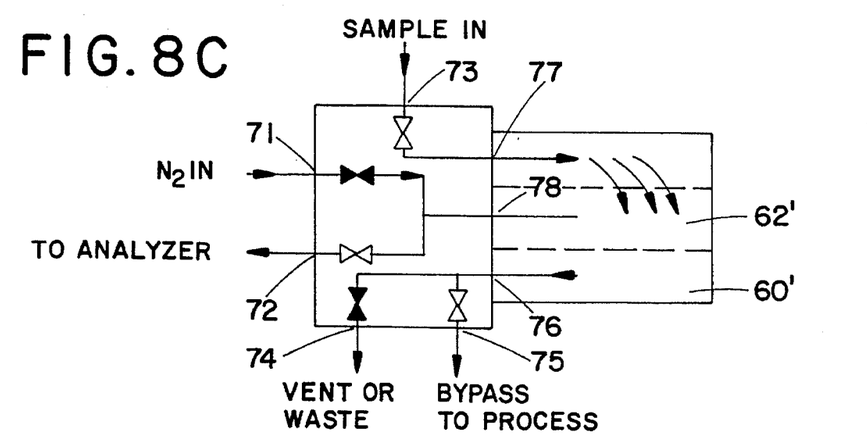
Figure 8D:
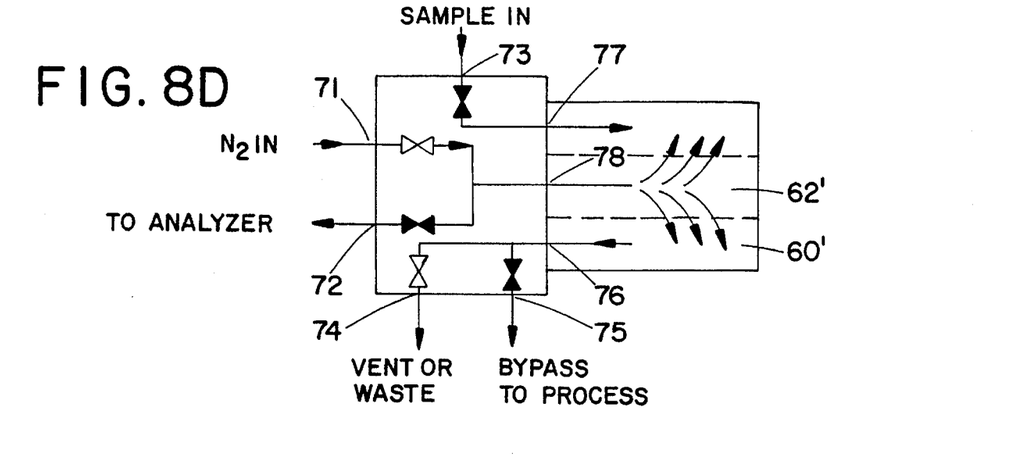

FIG. 8C illustrates how the unit of the Figure embodiment is connected into a system when it is to be used for particulate filtering. The various passageways are provided with the same numerals and the connections to the system shown. FIG. 8C is with the valve element 82 in the FIG. 5 position. By rotating the valve element 90° clockwise from the FIG. 5 showing, the purging function of FIG. 8D is accomplished. Notice that the supply of process fluid to the filter is simultaneously cut off when the purging fluid is opened as previously discussed with reference to FIG. 8B.

Figure 8E:
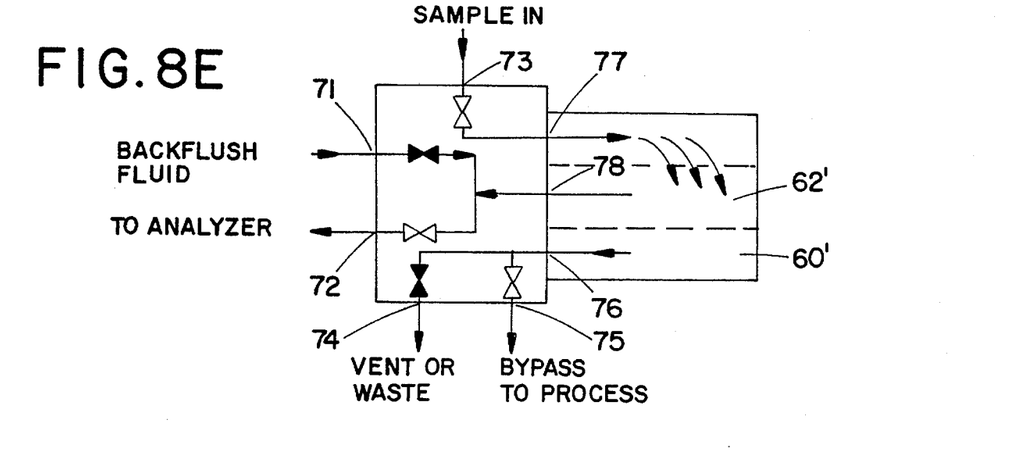
Figure 8F:
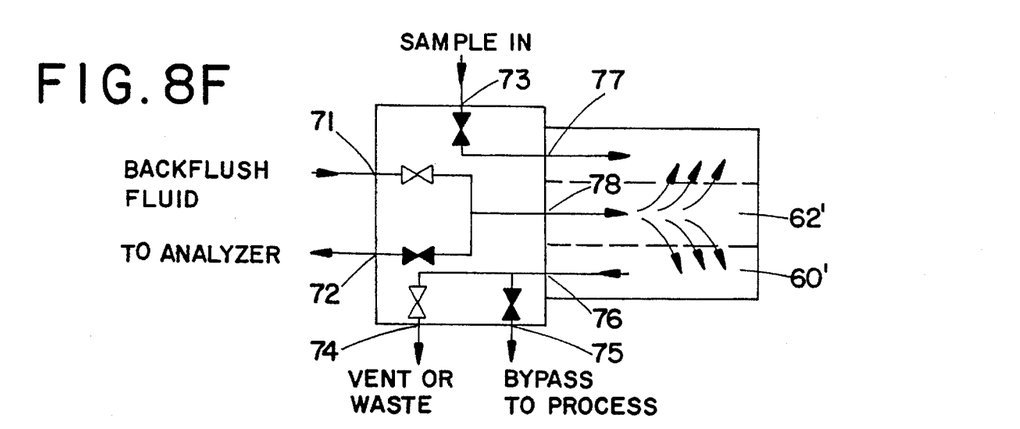

FIGS. 8E and 8F illustrate the system in use for particulate filtration but with a back flushing function provided. Note that the port or passageway 71 is in this embodiment connected with a back flush fluid supply. The main supply of process fluid from this associated system is connected with the passageway 73 and the other connections are identical to those shown and described with reference to FIG. 8C.

In the FIG. 8E showing, normal functioning takes place with the process fluid passing from the filter chamber portion 60' to portion 62' with a major portion of the process fluid bypassing about the filter to the bypass outlet passage 75. A small portion that is filtered passes through passageway 78 to passage 72 which is, at this time, in the open position. However, by rotating the valve element the previously-mentioned 90° in the clockwise direction, the back flush function shown in FIG. 8F takes place. The closure of the supply to the unit through passage 73 takes place simultaneously with the opening of the back flush fluid supplied through passage 71 and 78. The other passage connections between passage 72 and 78 are closed as is the main bypass passage 75. The back flushing fluid is, of course, discharged from chamber portion 60' through the passage connection 76 and 74 to vent or waste.

As can be seen from the foregoing, this integral valve arrangement greatly simplifies the mounting and valving of the assembly whether used in a coalescing or particulate filtering mode. The unit also eliminates possible system problems resulting from improper sequencing of the valves since all sequencing takes place automatically with a single valve movement.

A further advantage resulting from the FIG. 5 embodiment and the integral nature of the valve means is that the total volume that must be flushed during a purging operation is greatly reduced. This decreases both the time required for purging and, moreover, decreases the possibility that any areas or volumes will be missed by the purging fluid.

The valving design of the preferred embodiment also has the advantage of providing a "double block and bleed." In particular, note that undesired flow between ports 71, 72, 73, and 75 can only take place upon failure of two seals. In addition, the space between these ports is always open to the vented port 74.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A filter assembly particularly suited for use in fluid analyzer systems for particulate or coalescing filtration of fluids comprising:

a rigid body having spaced upper and lower faces joined by exterior side walls;

a circular filter receiving bore having a central axis and extending into the body from the upper face and terminating in a lower wall with a reduced diameter counterbore extending axially inwardly from the lower wall;

a tubular filter element having a lower end resting on the lower wall in surrounding relationship to the counter bore, the filter element extending outwardly from the filter receiving bore and terminating in an upper end;

a housing having a lower end joined to said body about the filter receiving bore with an opening extending from the housing lower end and forming a continuation of the filter receiving bore to define an enclosed filter chamber about the filter element;

a groove in the lower end of the housing encircling the opening that extends from the housing lower end;

a seal ring in the groove to seal between the housing lower end and the body;

a first pair of fluid passages radially spaced relative to the axis of said bore and extending through the body from the exterior side walls of the body and opening to the filter receiving bore at locations radially outwardly of the filter;

first and second additional fluid passages spaced from said first pair of fluid passages and extending through the body from the exterior side walls and opening to the counterbore; and, each of the first and second additional fluid passages having a central axis located in separate planes that are respectively coplanar with the planes containing the axes of separate ones of the first pair of fluid passages.

2. The filter assembly as defined in claim 1 wherein the housing is releasably joined to the body by thread means.

3. The filter assembly as defined in claim 2 wherein the thread means include a female nut with internal threads joined to external threads on the body.

4. The filter assembly as defined in claim 3 wherein the female nut includes a flange which extends radially relative to the axis of the bore overlies a flange on the housing.

5. The filter assembly as defined in claim 1 wherein the body includes mounting means on the lower wall.

6. The filter assembly as defined in claim 1 wherein the first pair of fluid passages are radially separated by approximately 90°.

7. The filter assembly as defined in claim 1 wherein the first and second additional fluid passages are separated from each other and the closest passageway of the first pair of passageways.

8. A filter assembly particularly suited for use in fluid analyzer systems for particulate or coalescing filtration of fluids comprising:

a body defining a filter chamber with a filter element positioned in the filter chamber to divide the filter chamber into first and second portions;

a valve chamber in the body;

at least five fluid flow passages connecting from the exterior of the body to the valve chamber; and, a valve means in the valve chamber movable between first and second positions, said valve means including flow controlling means operable in the first position of said valve means to connect a first and a second of the fluid flow passages with the first portion of the filter chamber and simultaneously connect a third flow passage with the second portion of the filter chamber while preventing flow through the fourth and fifth of the flow passages, said flow controlling means operable when said valve means is in the second position to prevent flow through the first, second and third flow passages while connecting the fourth flow passage to the first portion of the filter chamber and connecting the fifth flow passage with the second portion of the filter.

9. The filter assembly as defined in claim 8 wherein the valve means comprises a single valve element mounted for rotation in the valve chamber.

10. The filter assembly as defined in claim 9 wherein the valve element is a cylindrical member having seals in the exterior surface thereof mounted for movement past the at least five flow passages.

* * * * *